(12) United States Patent
Cheng et al.

(10) Patent No.: US 9,897,133 B2
(45) Date of Patent: Feb. 20, 2018

(54) CARBON FIBER WASHER

(71) Applicant: LinkWin Technology Co., Ltd., Taichung (TW)

(72) Inventors: Yi-Ching Cheng, Taichung (TW); Chun-Han Lai, Taichung (TW); Po-Chen Sung, Taichung (TW); Chang-Mou Wu, Taichung (TW); Wen-You Lai, Taichung (TW); Po-Chun Lin, Taichung (TW)

(73) Assignee: LinkWin Technology Co., Ltd., Taichung (TW)

( * ) Notice: Subject to any disclaimer, the term of this patent is extended or adjusted under 35 U.S.C. 154(b) by 66 days.

(21) Appl. No.: 15/131,073

(22) Filed: Apr. 18, 2016

(65) Prior Publication Data

US 2017/0298980 A1    Oct. 19, 2017

(51) Int. Cl.
| | |
|---|---|
| *F16B 43/00* | (2006.01) |
| *D03D 1/00* | (2006.01) |
| *D03D 13/00* | (2006.01) |
| *D06M 15/37* | (2006.01) |
| *B32B 5/02* | (2006.01) |
| *B32B 5/26* | (2006.01) |
| *B32B 7/12* | (2006.01) |
| *D01F 9/21* | (2006.01) |
| *D06M 101/40* | (2006.01) |

(52) U.S. Cl.
CPC .............. *F16B 43/00* (2013.01); *B32B 5/024* (2013.01); *B32B 5/26* (2013.01); *B32B 7/12* (2013.01); *D01F 9/21* (2013.01); *D03D 1/00* (2013.01); *D03D 13/00* (2013.01); *D06M 15/37* (2013.01); *B32B 2255/02* (2013.01); *B32B 2255/26* (2013.01); *B32B 2260/023* (2013.01); *B32B 2260/046* (2013.01); *B32B 2262/106* (2013.01); *B32B 2581/00* (2013.01); *D06M 2101/40* (2013.01); *D10B 2101/12* (2013.01); *D10B 2505/00* (2013.01)

(58) Field of Classification Search
CPC ........ F16B 43/00; F16B 43/001; B32B 5/024; B32B 5/026
USPC .................................. 411/531, 542
See application file for complete search history.

(56) References Cited

U.S. PATENT DOCUMENTS

| | | | | |
|---|---|---|---|---|
| 2,761,347 A | * | 9/1956 | McKee, Jr. | ........... F16B 43/001 238/DIG. 1 |
| 2,982,573 A | * | 5/1961 | McKee, Jr. | ........... F16B 43/001 277/637 |
| 3,168,321 A | * | 2/1965 | Glicksman | ............ F16B 43/001 277/637 |
| 3,255,559 A | * | 6/1966 | Gaeth | ...................... A62C 3/00 411/531 |
| 3,298,271 A | * | 1/1967 | Krueger | .................... B41L 5/00 411/258 |

(Continued)

Primary Examiner — Roberta S Delisle
(74) Attorney, Agent, or Firm — Alan D. Kamrath; Kamrath IP Lawfirm, P.A.

(57) ABSTRACT

A carbon fiber washer is provided and includes a carbon fiber fabric made of a plurality of fiber bundles being woven, in which each of the plurality of fiber bundles is made of discontinuous fibers; the advantage of the carbon fiber washer of the present invention includes high temperature and fatigue resisting, and weather proofing. The structure of the carbon fiber washer is stable due to the use of discontinuous fibers; breakages of discontinuous fibers do not affect other unbroken discontinuous fibers, so that the structure of the carbon fiber washer would not be loosened or delaminated and the service life can be prolonged accordingly.

8 Claims, 8 Drawing Sheets

(56) References Cited

U.S. PATENT DOCUMENTS

| | | | | | |
|---|---|---|---|---|---|
| 3,495,907 | A | * | 2/1970 | Rogers | F16B 31/028 356/34 |
| 4,056,645 | A | * | 11/1977 | Henry | B60V 1/16 180/128 |
| 4,177,999 | A | * | 12/1979 | Raber | F16B 43/001 277/637 |
| 4,292,876 | A | * | 10/1981 | De Graan | F16B 43/001 411/369 |
| 5,489,180 | A | * | 2/1996 | Ichihara | B32B 7/02 411/544 |
| 5,649,798 | A | * | 7/1997 | Ito | F16B 35/041 411/369 |
| 7,988,395 | B2 | * | 8/2011 | Steffier | F16B 3/00 411/283 |
| 8,026,189 | B1 | * | 9/2011 | Pryne | D03D 11/00 139/408 |
| 8,029,223 | B2 | * | 10/2011 | Mair | F16B 35/06 411/371.2 |
| 2009/0030132 | A1 | * | 1/2009 | Kumazawa | C08F 285/00 524/493 |
| 2009/0104418 | A1 | * | 4/2009 | Ohki | B29C 43/003 428/213 |
| 2010/0143076 | A1 | * | 6/2010 | Matsumoto | F16J 15/104 411/533 |
| 2010/0170632 | A1 | * | 7/2010 | Gautriaud | B32B 25/08 156/244.17 |
| 2012/0003061 | A1 | * | 1/2012 | Hill | F16B 19/02 411/531 |
| 2013/0247490 | A1 | * | 9/2013 | Strait | E04D 12/002 52/302.1 |
| 2013/0280473 | A1 | * | 10/2013 | Preisler | B60R 13/011 428/95 |

* cited by examiner

CARBON FIBER WASHER

FIELD OF THE INVENTION

The present invention relates to carbon fiber washer, and more particularly to a carbon fiber washer having discontinuous carbon fibers.

BACKGROUND OF THE INVENTION

Washers and gaskets are essential to mechanical structures. For instance, metal washers or flat washers are often utilized for fastening screws in order to prevent loosening, spring washers are often utilized to press against objects to prevent leakages, and transmission or winding gaskets are usually implemented in rotating mechanisms. Taking conventional winding gaskets used in fishing reels as an example, conventional winding gaskets bear with abrasions from physical frictions during high-speed rotations, and some are even applied to auxiliary braking mechanisms, and so abrasion resisting, self-lubricating, and high temperature resisting performances of the gaskets are highly required. Metal based and composite materials are the two major types of materials being used in fishing reels or other similar mechanisms. Metal-based materials have lots of benefits such as outstanding thermal conductivities, however, thermal expansion of metals causes problems; Composite materials like winding gaskets contains laminated fiber fabrics formed of continuous fibers, see FIG. 8, and that breakages of the continuous fibers would cause delamination thereby loosening the entire structure and reducing the service life.

SUMMARY OF THE INVENTION

In light of the above imperfections, a carbon fiber washer is provided. The carbon fiber washer includes woven discontinuous fibers, so that while the carbon fiber washer is worn and a part of carbon fibers are abrade or torn, others will not be affected. As a result, the entire structure will not be loosened or delaminated, so as to prolong the service life of the carbon fiber washer.

A carbon fiber washer is provided and includes a carbon fiber fabric made of a plurality of woven fiber bundles, and each of the fiber bundles is formed of a plurality of discontinuous fibers.

According to an embodiment of the present invention, a bonding material is in between two or more of the carbon fiber fabrics, the bonding material partially infiltrates or impregnates the spaces between the discontinuous fibers of the carbon fiber fabrics; the outer surface of the carbon fiber washer includes at least a portion not infiltrated with the bonding material.

According to an embodiment of the present invention, the carbonization ratio of the carbon fiber fabric ranges from 10% to 95%.

According to an embodiment of the present invention, the impregnation ratio of the bonding material being infiltrated into the carbon fiber fabrics ranges from 40% to 80%.

According to an embodiment of the present invention, the bonding material is thermal-plastic or thermal-setting resin, and the discontinuous fiber is formed by carbonizing acrylic fiber.

According to an embodiment of the present invention, the thermal-plastic resin is polyester or polysulfone resin, and the thermal-setting resin is epoxy or phenolic resin.

According to an embodiment of the present invention, a stacking structure can be formed by two of the carbon fiber fabrics with a supporting material, and the two carbon fibers are located at the outer side of the stacking structure.

According to an embodiment of the present invention, the carbon fiber washer further includes a supporting material disposed between two of the bonding materials, each of the bonding materials is disposed between one of the carbon fiber fabrics and the supporting material, and the outmost layers of the carbon fiber washer are the two of the carbon fiber fabrics.

According to an embodiment of the present invention, the supporting material is carbon fiber fabric, thin fiber fabric, basalt fiber fabric, or glass fiber fabric or the combination thereof.

Accordingly, the carbon fiber washer of the present invention has numerous advantages listed below:

1. The carbon fiber washer of the present invention is not just high-temperature resisting, fatigue resisting, and weather proofing, but self-lubricating and abrasion resisting due to the short, discontinuous fiber of the outer most carbon fiber fabrics of the carbon fiber washer.

2. The carbon fiber washer includes woven discontinuous fibers, so that while the carbon fiber washer is worn and a part of carbon fibers are abrade or torn, other carbon fibers will not be affected. As a result, the entire structure will not be loosened or delaminated, so as to prolong the service life of the carbon fiber washer.

3. The carbon fiber washer of the present invention can be widely applied to various fields according to its carbonization ratios, such as implementing highly carbonized carbon fiber washer into automobile transmissions as gaskets, fishing reels, or other machines or apparatuses having highly rotating gears, and implementing mid-carbonized carbon fiber washer into machines having gears operating in lower rotating speed, such as food-grade processing machines, rather than using lubricating oils which may remain in the foods during the process. Low carbonized carbon fiber washers require lower manufacturing costs. Besides, low carbonized carbon fiber washers can not just be working with low speed gears, but be used as screw washers.

BRIEF DESCRIPTION OF THE DRAWINGS

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

The structure and technical features of the present invention will now be described in considerable detail with reference to some embodiments and the accompanying drawings thereof, so that the present invention can be easily understood.

A carbon fiber washer is provided according to the present invention and includes a carbon fiber fabric 11 made of a plurality of fiber bundles 111 being woven, and each of the plurality of fiber bundles is made of a plurality of discontinuous fibers 1111. Preferably, the fiber bundles 111 are woven in both latitude and longitude directions as shown in the SEM images of FIG. 1 to FIG. 4.

A method for producing a carbon fiber fabric 11 is further provided and includes the following steps:

(1) Providing a plurality of non-carbonized discontinuous fibers and twisting, bundling the discontinuous fibers into lines, in which the discontinuous fibers can be acrylic fibers.

(2) Interlacing and weaving the bundled non-carbonized discontinuous fibers by different methods to form a non-carbonized fiber fabric having various kinds of weaving patterns; the weaving method mentioned above is not limited to any specific way. Nonetheless, shuttleless weaving, such as plain weaving, is preferable; when the carbon fiber washer is formed by shuttleless weaving, the transmission of transverse shear stress generated during operation can be cut-off, thereby preventing damages.

(3) Carbonizing the non-carbonized fiber fabric by applying a temperature ranging from 400° C.~3500° C. for forming the carbon fiber fabric 11, where, preferably, the carbonization ratio of the carbon fiber fabric can be ranged from 10% to 95%.

Figure 1:
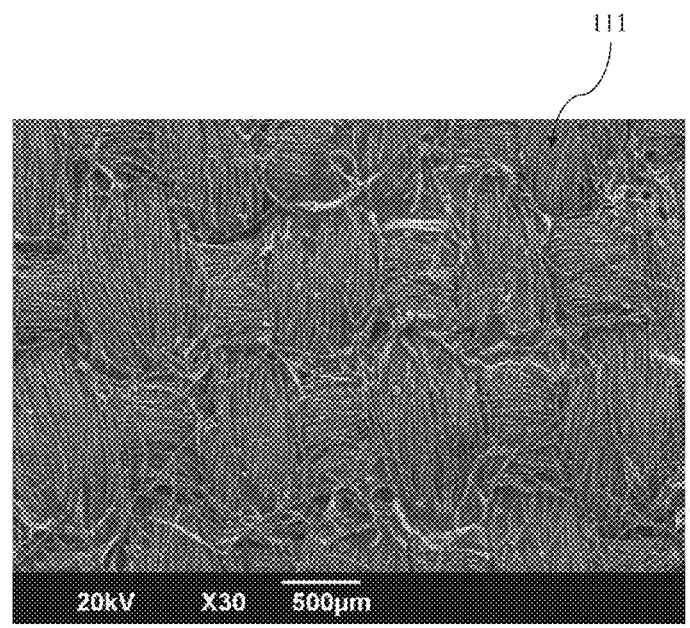
FIG. 1 is an SEM image of the carbon fiber washer.
Figure 2:
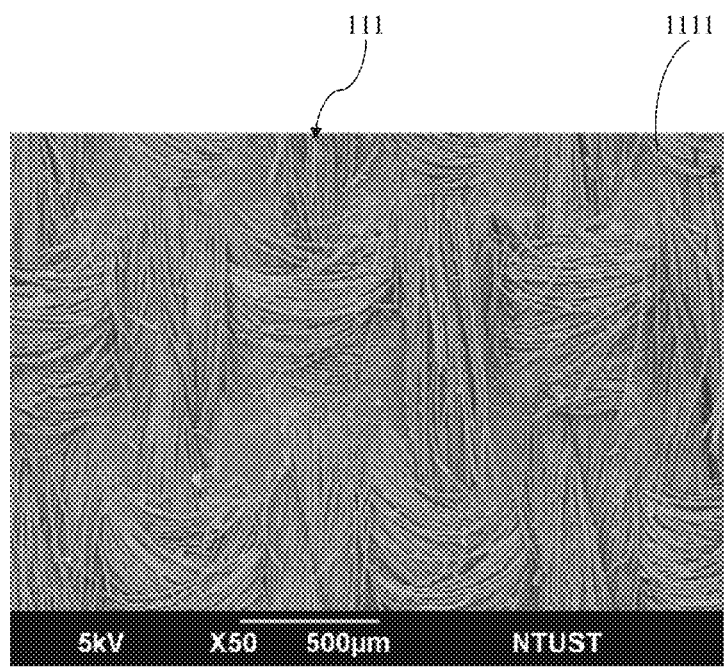
FIG. 2 is another SEM image of the carbon fiber washer.
Figure 3:
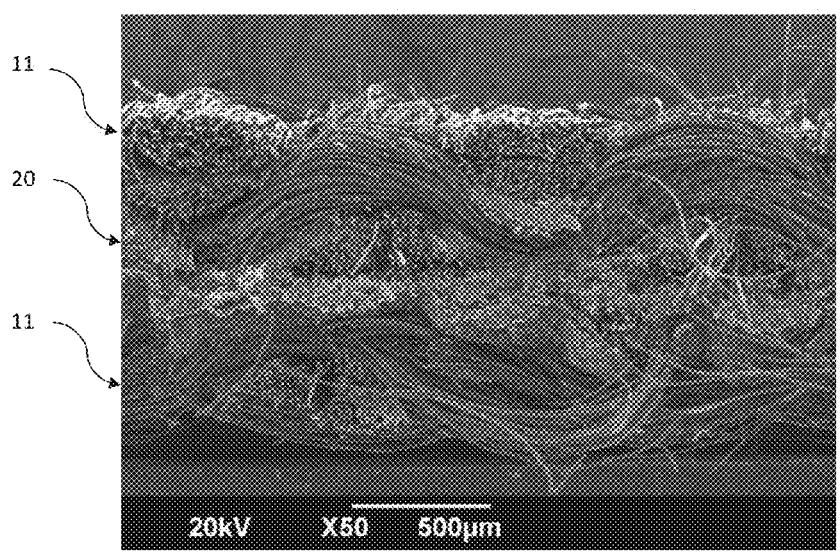
FIG. 3 is an SEM image of the cross-section of the carbon fiber washer.
Figure 4:
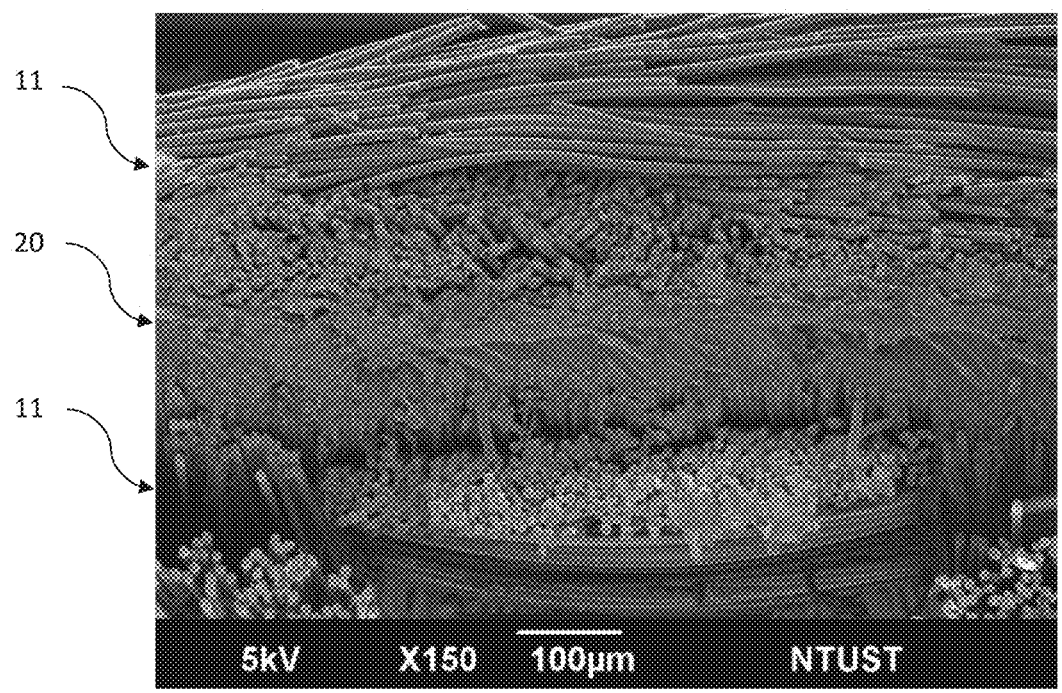
FIG. 4 is another SEM image of the cross-section of the carbon fiber washer.

Referring to FIG. 3 to FIG. 4, the carbon fiber fabrics 11 of the first preferred embodiment of the present invention made by the aforementioned method are then superimposed to each other side by side to form a laminated structure. The carbon fiber fabrics 11 are bonded by a bonding material 20. The bonding material 20 can be thermal-plastic resin such as polyester and polysulfone resin, or thermal-setting resin such as epoxy and phenolic resin. A hot-pressing machine is applicable to bond the carbon fiber fabrics 11 with the bonding material 20 by applying a pressure of 45~250 kg/cm$^2$ and a temperature not more than 350° C. Further, the carbon fiber fabrics 11 are bonded with the bonding material 20 having a predetermined thickness by laminating with hot-pressing, so that the bonding material 20 can be melted and infiltrated into the discontinuous fibers of the carbon fiber fabric 11, as shown in FIG. 3 to FIG. 4. The bonding material 20 may partially infiltrate or impregnate the spaces between the discontinuous fibers 1111, and the outer surface of the carbon fiber washer 10 includes at least a portion not infiltrated with the bonding material 20. After hardening of the bonding material 20 by, for instance, thermal-setting, each two carbon fiber fabrics 11 are bonded and combined to each other, thereby providing strong structural rigidity and preventing delaminating. The predetermined thickness mentioned above depends on the thickness of the carbon fiber fabric 11, the volume percentage, and the impregnation ratio to be reached. For instance, if the impregnation ratio impregnated with the bonding material 20 to be reached is 40%~80%, the predetermined thickness of the bonding material 20 can be ranged from 40 vt % to 80 vt % of the carbon fiber fabric 11. The bonding material 20 can be partially infiltrated into the carbon fiber fabrics 11 by coating, spraying or film stacking. Hence, the carbon fiber washer of the present embodiment provides self-lubricating and abrasion resisting due to the short, discontinuous fibers of the carbon fiber fabric 11 located at the outermost layer of the carbon fiber washer.

In light of mass-producing the carbon fiber washer of the present invention, the materials of the carbon fiber washer including the carbon fiber fabrics 11 and the bonding material 20 can be prepared as rolls, such that a roll-to-roll process can be performed to produce carbon fiber washers having laminated structures. The material of the bonding material 20 can be selected according to the surface property of the bonding object. High pressure and high temperature are applied during the bonding process, thereby strengthening the structure of the laminated carbon fiber washer. The laminated structure having the carbon fiber fabrics 11 and the bonding materials 20 will be formed in rolls, and then further cutting processes such as stamping and cropping can be applied to cut out the carbon fiber washers 10.

Figure 5:
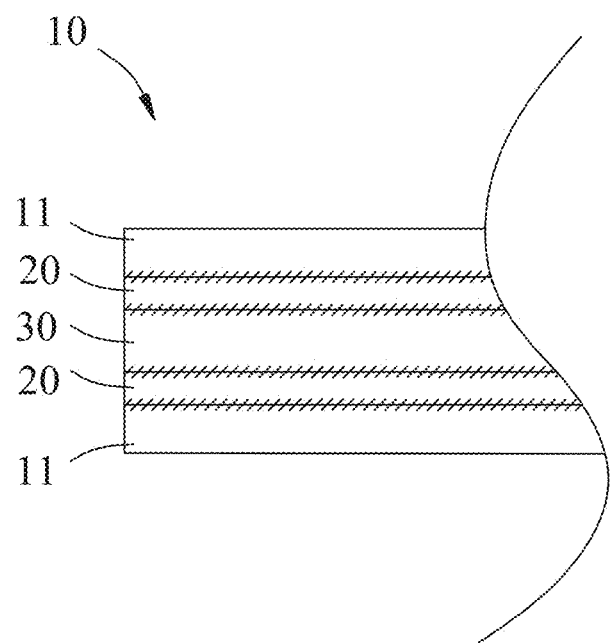
FIG. 5 is a schematic diagram illustrating a second preferred embodiment of the present invention.

The second preferred embodiment of the present invention as shown in FIG. 5 is that other than combining each two carbon fiber fabrics 11 with the bonding material 20. The carbon fiber washer may further includes a supporting material disposed between two of the bonding materials, each of the bonding materials is disposed between one of the carbon fiber fabrics and the supporting material, and the outmost layers of the carbon fiber washer are the two of the carbon fiber fabrics. The carbon fiber washer 10 includes materials combined in a side-to-side order of carbon fiber fabric 11, bonding material 20, supporting material 30, bonding material 20, and carbon fiber fabric 11. Because the thickness of one single carbon fiber fabric 11 is thin and is utilized for lubricating against other mechanical components during operation, the supporting material 30 can be applied for thickening to strengthen the carbon fiber washer 10. The supporting material 30 can be carbon fiber fabric, thin fiber fabric, basalt fiber fabric, or glass fiber fabric. A sandwich structure of the carbon fiber washer 10 of the present invention is formed while the carbon fiber washer 10 contains three or more laminas, in which the carbon fiber fabrics 11 are located to be the outer most layers of the carbon fiber washer 10, and the other supporting materials 30 (which might contain one single lamina or laminas) are included at the inner side of the carbon fiber washer 10.

The followings are results showing benefits of the present invention, such as abrasion resisting, self-lubricating and thermal conducting. Referring to Table 1 and Table 2 below, illustrating physical properties of samples produced from the method for producing the carbon fiber washer of the present invention.

TABLE 1

| Sample code | Carbonization temperature (° C.) | Thickness (mm) | Basis weight (g/m$^2$) | Warp density (/inch) |
|---|---|---|---|---|
| CF-1001-T | ~1085 | 0.6 | 260 | 46 |
| CF-1003-T | ~1075 | 0.48 | 150 | 50 |
| CF-1001-Z | 1080~1090 | 0.55 | 300 | 46 |
| CF-1003-Z | 1070~1090 | 0.48 | 170 | 50 |

TABLE 2

| Sample code | Latitude density (/inch) | Number of Laminas | Thermal conductivity (W/cm · ° C.) |
|---|---|---|---|
| CF-1001-T | 28 | 5 | 4.98 |
| CF-1003-T | 28 | 3 | 4.54 |
| CF-1001-Z | 28 | 5 | 4.64 |
| CF-1003-Z | 28 | 3 | 4.47 |

Figure 6:
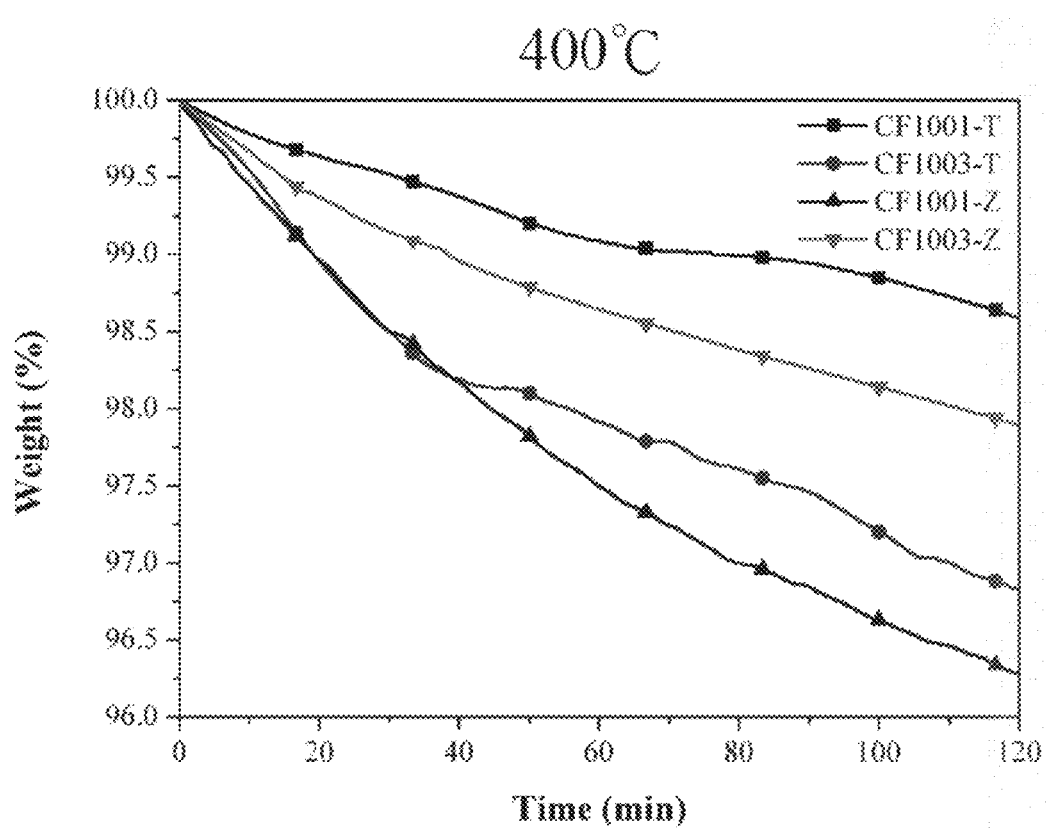
FIG. 6 shows a TGA result of samples of the present invention being tested under 400° C.
Figure 7:
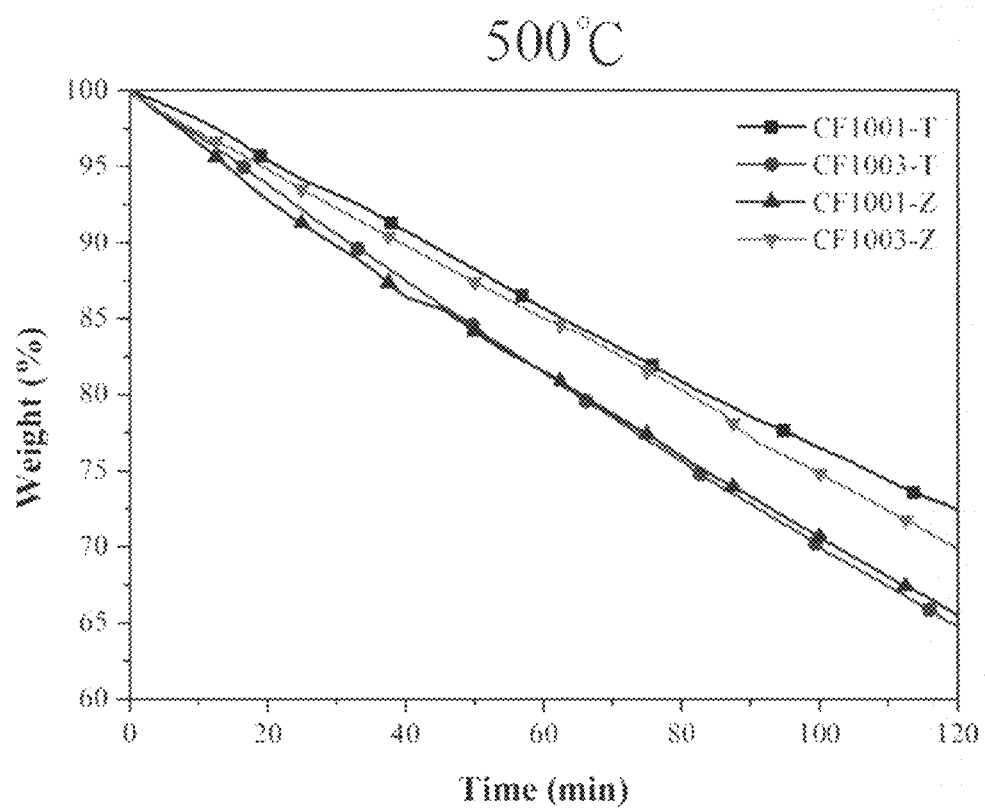
FIG. 7 shows a TGA result of samples of the present invention being tested under 500° C.
Figure 8:
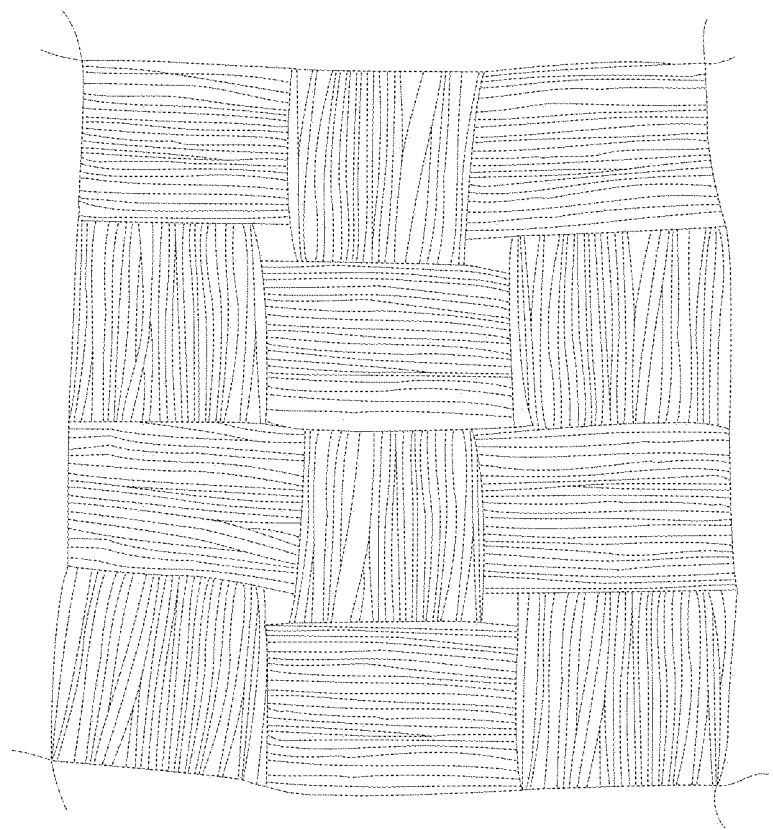
FIG. 8 is a schematic diagram showing a conventional woven carbon fiber washer with continuous carbon fibers.

The thermal conductivities of the samples are around 5 (W/cm-° C.), proving that the heats generated from physical frictions and abrasions during operation can be rapidly conducted and dissipated, thereby preventing damages caused by high temperatures of either the operating machine or the fibers. Please refer to FIG. 6 to FIG. 7, which show TGA (TGA Q500) results of the samples listed in Table 1 and Table 2 being tested under 400° C. and 500° C. respectively. The weight percent losses of the samples under 400° C. are less than 3%, and the weight percent losses of the samples under 500° C. are less than 18%, which means that the quality of the samples are stable under high temperatures; the structure and the fibers are not easily damaged.

Referring to Table 3 below, the dynamic and static friction coefficients, abrasions, and the heat distortion temperatures of the samples are tested under the ASTM D1894, ASTM D3884, and ASTM D648 standard test methods. According to the testing results showing the static and dynamic friction coefficients of the samples, the carbon fiber structure woven with discontinuous fibers of the present invention indeed provides self-lubricating effects. Additionally, the carbon fiber washer 10 formed with discontinuous fibers is high temperature and abrasion resisting according to the test results below.

TABLE 3

| Sample code | Static friction coefficient | Dynamic friction coefficient | Abrasion (g) | Heat distortion temperature (° C.) |
|---|---|---|---|---|
| CF-1001-T | 0.41 | 0.41 | 0.3318 | 157.0 |
| CF-1003-T | 0.27 | 0.27 | 0.0468 | 161.1 |
| CF-1001-Z | 0.27 | 0.27 | 0.1521 | 172.6 |
| CF-1003-Z | 0.41 | 0.41 | 0.2568 | 157.8 |

According to the test results above, the structure woven from discontinuous carbon fibers of the present invention is not only self-lubricating, abrasion and high temperature resisting, but with outstanding structural stability; while a part of the carbon fibers are broken, those broken carbon fibers will not affect the stability of the entire woven fiber structure, so that the structure will not be easily loosened or delaminated, so as to prolong the service life of the carbon fiber washer of the present invention.

Referring to Table 4 below showing abundance of elements under different carbonization ratios of sample code CF-1001-Z of the present invention carbonized with different carbonization temperatures. Carbon fiber washers carbonized under lower temperatures have more functional groups to be more easily bonding with bonding materials like resins, so that the structure will not be easily delaminated.

TABLE 4

| Sample code | Carbonization temperature ° C. | Carbonization ratio | Nitrogen abundance N % | Carbon abundance C % | Hydrogen abundance H % |
|---|---|---|---|---|---|
| CF-1001-Z | 1080~1090 | 85 | 6.604 | 84.505 | 1.056 |

TABLE 4-continued

| Sample code | Carbonization temperature ° C. | Carbonization ratio | Nitrogen abundance N % | Carbon abundance C % | Hydrogen abundance H % |
|---|---|---|---|---|---|
| CF-1001-Z | 850 | 70 | 12.808 | 69.986 | 1.768 |

The carbon fiber washer of the present invention can be widely applied to various fields according to its carbonization ratios. For instance, highly carbonized carbon fiber washers (carbonization ratio ranged between 60%~90%) can be implemented into automobile transmissions as gaskets, fishing reels, or other machines or apparatuses having highly rotating gears. Additionally, mid-carbonized carbon fiber washer (carbonization ratio ranged between 30%~60%) can be implemented into machines having gears operating in lower rotating speed, such as food-grade processing machines, rather than using lubricating oils which may remain in the foods during the process. Low carbonized carbon fiber washers (carbonization ratio ranged between 10%~30%) can not just be working with low speed gears, but be used as screw washers.

What is claimed is:

1. A carbon fiber washer, comprising a carbon fiber fabric made of a plurality of woven fiber bundles, wherein each fiber bundle is formed of a plurality of discontinuous fibers,
    wherein a bonding material is in between two or more of the carbon fiber fabrics, the bonding material partially infiltrates or impregnates the spaces between the discontinuous fibers, the outer surface of the carbon fiber washer includes at least a portion not infiltrated with the bonding material, and
    wherein the carbon fiber washer further including a supporting material disposed between two of the bonding materials, each of the bonding materials is disposed between one of the carbon fiber fabrics and the supporting material, and the outmost layers of the carbon fiber washer are the two of the carbon fiber fabrics.

2. The carbon fiber washer as claimed in claim 1, wherein the carbonization ratio of the carbon fiber fabric ranges from 10% to 95%.

3. The carbon fiber washer as claimed in claim 1, wherein the carbonization ratio of the carbon fiber fabric ranges from 10% to 95%.

4. The carbon fiber washer as claimed in claim 1, wherein the impregnation ratio of the bonding material being infiltrated into the carbon fiber fabrics ranges from 40% to 80%.

5. The carbon fiber washer as claimed in claim 4, wherein the bonding material is thermal-plastic or thermal-setting resin, and the discontinuous fiber is formed by carbonizing acrylic fiber.

6. The carbon fiber washer as claimed in claim 5, wherein the thermal-plastic resin is polyester or polysulfone resin, and the thermal-setting resin is epoxy or phenolic resin.

7. The carbon fiber washer as claimed in claim 1, wherein a stacking structure is formed by two of the carbon fiber fabrics with a supporting material, and the two carbon fibers are located at the outer side of the stacking structure.

8. The carbon fiber washer as claimed in claim 7, wherein the supporting material is carbon fiber fabric, thin fiber fabric, basalt fiber fabric, or glass fiber fabric or the combination thereof.

* * * * *